(No Model.)
E. SIDE.
AUTOMATIC WEIGHING SCOOP.
No. 412,049. Patented Oct. 1, 1889.
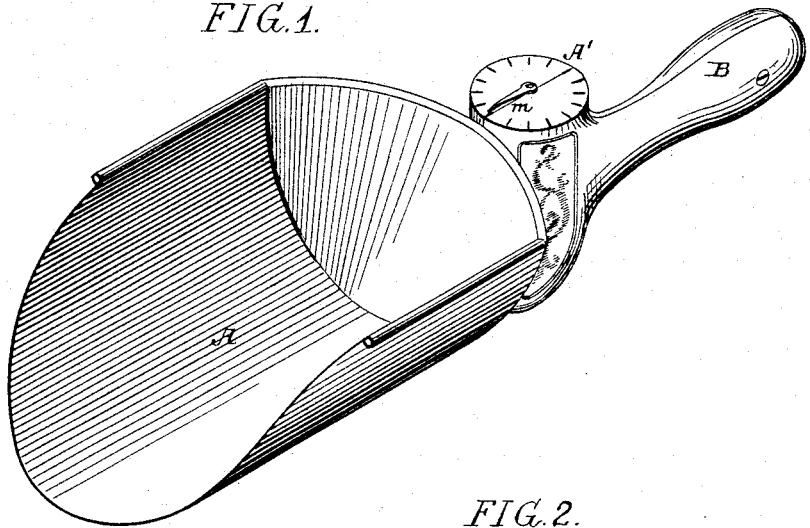
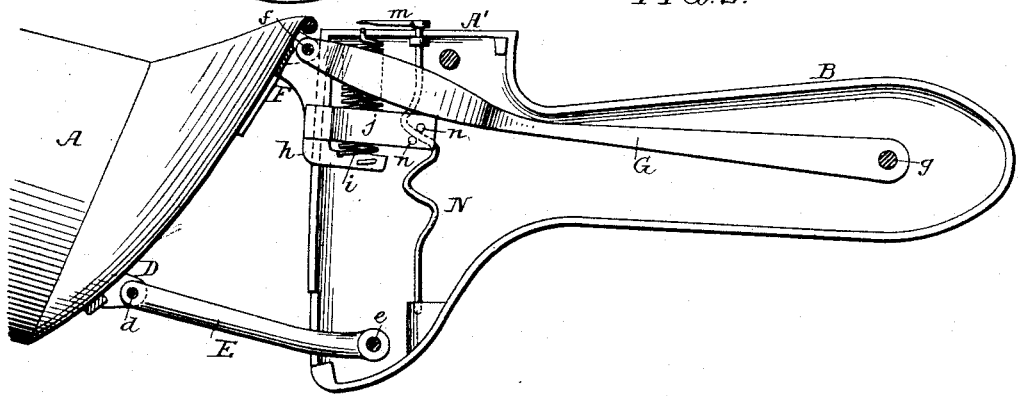
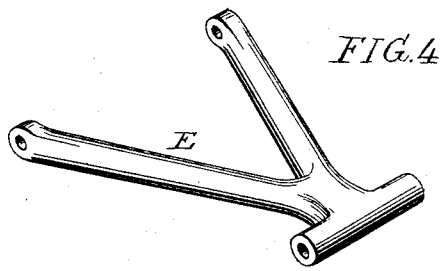
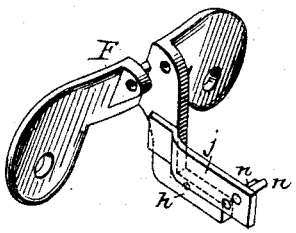
Witnesses:
David S. Williams
Alex. Barkoff
Inventor:
Edgar Side
by his Attorneys
Howson & Howson

UNITED STATES PATENT OFFICE.

EDGAR SIDE, OF PHILADELPHIA, ASSIGNOR, BY DIRECT AND MESNE ASSIGNMENTS, TO JOSEPH J. CARR AND F. C. STURGES, OF WILKESBARRÉ, PENNSYLVANIA.

AUTOMATIC WEIGHING-SCOOP.

SPECIFICATION forming part of Letters Patent No. 412,049, dated October 1, 1889.

Application filed August 28, 1888. Serial No. 283,989. (No model.)

*To all whom it may concern:*

Be it known that I, EDGAR SIDE, a citizen of the United States, residing in Philadelphia, Pennsylvania, have invented certain Improvements in Automatic Weighing-Scoops, of which the following is a specification.

The object of my invention is to construct an automatic weighing-scoop that will be accurate in its movements, have few parts, and the indicating-dial of which is so situated as to be readily observed by the clerk.

In the accompanying drawings, Figure 1 is a perspective view of my improved automatic weighing-scoop. Fig. 2 is a longitudinal section of the same, and Figs. 3 and 4 are detached perspective views of parts of the device.

Referring to the drawings, A is the scoop, made of any suitable sheet metal, and B is the handle, preferably made in the form of a two-part casing and hollow, and containing the weighing mechanism described hereinafter.

On the lower portion of the scoop is a bracket D, carrying a pivot-pin $d$, and on this pin is pivoted a yoked link E, pivoted also to a pin $e$ in the handle portion A.

On the upper portion of the scoop is a bracket F, and to this bracket is pivoted a long link G by a pivot-pin $f$. This link is connected to a pivot-pin $g$ at the end of the handle. Depending from the bracket F is a short arm $h$, bent as shown, and to this arm is secured one end of a balance-spring $i$, the other end being secured to the dial portion A′ of the handle, the spring thereby serving to suspend the scoop on the said handle. Extending from the arm $h$ is a second arm $j$, carrying two pins $n\ n$, which pass on each side of a helical shaft N, having its bearings in the upper and lower portions of the handle. To the upper end of this shaft is secured a hand $m$.

I have shown the shaft N made of wire, but it will be understood that it may be a plain shaft with a screw cut thereon. The shaft, as will be seen on reference to Fig. 1, is in the center of the dial A′, so that any vertical movement of the scoop independently of the handle will rotate the shaft and its hand, and will consequently indicate the weight of the contents of the scoop. This dial is marked in the present instance in ounces up to a pound; but it will be understood that any degrees may be marked on the dial without departing from my invention.

In place of the spring $i$ weights may be used, being the equivalent, without departing from my invention.

I claim as my invention—

1. The combination, in an automatic weighing-scoop, of the scoop, the handle, the dial thereon, a spring by which the scoop is suspended on the handle, with a helical shaft having a hand, and with an arm on the scoop engaging with the helical shaft.

2. The combination of the scoop-handle having two pivot-pins, the scoop and links connecting the scoop to said pins, with an indicator-shaft, an arm on the scoop engaging with said shaft, and a balance-spring supporting the scoop on the handle, substantially as described.

3. The combination, in an automatic weighing-scoop, of the handle and the scoop pivotally connected thereto, a spring suspending the scoop on the handle, with an indicating-dial the face of which is parallel with the upper face of the scoop, and a pointer geared to the scoop, substantially as described.

4. In a weighing device, the combination of a relatively-fixed handle or base part, a movable weighing scoop or platform, and a rotary indicator with a helical axis controlled by the moving scoop and operating the rotary indicator.

In testimony whereof I have signed my name to this specification in the presence of two subscribing witnesses.

EDGAR SIDE.

Witnesses;
   WM. EISENBROWN,
   P. J. MCCARTY.